US011084091B2

(12) United States Patent
Makinen (10) Patent No.: US 11,084,091 B2
(45) Date of Patent: Aug. 10, 2021

(54) SYSTEM AND METHOD FOR DETECTING 3D PRINTING ERRORS (71) Applicant: William Makinen, Alexandria, VA (US)

(72) Inventor: William Makinen, Alexandria, VA (US)

(*) Notice: Subject to any disclaimer, the term of this patent is extended or adjusted under 35 U.S.C. 154(b) by 114 days.

(21) Appl. No.: 16/257,926

(22) Filed: Jan. 25, 2019

(65) Prior Publication Data

US 2019/0388967 A1 Dec. 26, 2019

Related U.S. Application Data (60) Provisional application No. 62/622,795, filed on Jan. 26, 2018.

(51) Int. Cl.
| *B22F 3/105* | (2006.01) |
| *G06F 3/12* | (2006.01) |
| *B33Y 40/00* | (2020.01) |
| *B33Y 10/00* | (2015.01) |
| *B33Y 30/00* | (2015.01) |
| *B33Y 50/02* | (2015.01) |

(52) U.S. Cl.
CPC .............. *B22F 3/105* (2013.01); *G06F 3/121* (2013.01); *B33Y 10/00* (2014.12); *B33Y 30/00* (2014.12); *B33Y 40/00* (2014.12); *B33Y 50/02* (2014.12)

(58) Field of Classification Search
None
See application file for complete search history.

(56) References Cited

U.S. PATENT DOCUMENTS

| 10,265,911 B1* | 4/2019 | Capri ..................... G06T 7/001 |
| 2002/0070363 A1* | 6/2002 | Muraki .............. G01N 21/8851 250/559.45 |
| 2015/0120033 A1* | 4/2015 | Hotta .................. G05B 19/4099 700/119 |
| 2015/0301517 A1* | 10/2015 | Chen ..................... B33Y 50/02 700/118 |
| 2016/0151978 A1* | 6/2016 | Lin ....................... B29C 64/106 264/40.7 |
| 2018/0322621 A1* | 11/2018 | Craeghs .............. B23K 26/342 |

* cited by examiner

*Primary Examiner* — Delomia L Gilliard
(74) *Attorney, Agent, or Firm* — Hunton Andrews Kurth LLP (57) ABSTRACT

A system for detecting a 3D printing error is described. The system comprising an image capturing device for generating at least one image of a first 3D print job creating an object and at least one image of a second 3D print job. The second 3D print job is creating the same object as the first 3D print job. The system also comprises an error detection module for comparing the at least one image of the second 3D print job to the at least one first image of the first 3D print job. The error detection module then triggers an error signal if a difference between the at least one image of the second 3D job and the at least one first image of the first 3D print job exceeds a threshold.

14 Claims, 9 Drawing Sheets

Camera Filter $$PixelBrightness(loc\ Z) = \frac{\{|Cal(R) - Anlys(R)| + |Cal(G) - Anlys(G)| + |Cal(B) - Anlys(B)|\}}{3}$$

```
if (PixelBrightness(loc Z) > Threshold) {
    PixelBrightness(loc Z) = 255;
}
else {
    PixelBrightness(loc Z) = 0;
}
```

SYSTEM AND METHOD FOR DETECTING 3D PRINTING ERRORS

RELATED APPLICATIONS

This application claims priority to U.S. Provisional Application No. 62/622,795, filed Jan. 26, 2018, entitled "System and Method for Detecting 3D Printing Errors" which is hereby incorporated by reference.

FIELD OF THE INVENTION

This invention relates generally to systems and methods for detecting 3D printing errors, and more particularly for systems and methods for detecting 3D printing errors using image analysis.

BACKGROUND OF THE INVENTION 3D printing is rapidly increasing in popularity and its potential uses and impact have not yet been fully realized. One problem with current 3D printing techniques is the inability of current systems and methods to readily and reliably detect errors during the printing process. This is particularly troublesome in production environments where the same object is printed in mass quantities.

These and other problems exist.

SUMMARY OF THE INVENTION

An object of the present invention is to overcome the aforementioned and other drawbacks existing in the prior art.

The inventions described herein use an image capturing device (e.g., camera) to detect errors in 3D prints. In some embodiments, a camera system employed may be used in mass manufacturing scenarios. For example, when a fleet of printers is being used to simultaneously print numerous copies of a component, it may be feasible to perform a calibration print beforehand. During this calibration print, the printer will cease printing every few layers (determined beforehand by the user, e.g., 20-50 depending on the length of the print). Every time the printing stops, a picture may be taken of the current progress using a camera, webcam, or other imaging device. Once the user is satisfied with quality of the calibration print, the production prints can begin. During this time, the printer will follow the same steps as the calibration run, taking pictures of the print every few layers. This time, however, it will compare the "test" picture to the corresponding calibration picture, and perform a number of pixel operations to detect any differences between the two. Given that both pictures are taken from the exact same location with the exact same lighting, any differences between them would be characteristic of a print error. If the number of different pixels are above a certain threshold, the print will be declared a failure and a notification will be sent to the user.

According to one embodiment of the invention, a method for detecting a 3D printing error is provided. The method comprising the steps generating at least one image of a first 3D print job creating, and generating at least one image of a second 3D print job, wherein the second 3D print job is creating the same object as the first 3D print job. Next, the at least one image of the second 3D job to the at least one first image of the first 3D print job are compared. If a difference between the at least one image of the second 3D job and the at least one first image of the first 3D print job exceeds a threshold, an error signal is triggered.

According to another embodiment, a system for detecting a 3D printing error is provided. The system comprising an image capturing device for generating at least one image of a first 3D print job creating and at least one image of a second 3D print job, wherein the second 3D print job is creating the same object as the first 3D print job. The system also comprises an error detection module for comparing the at least one image of the second 3D job to the at least one first image of the first 3D print job, and triggering an error signal if a difference between the at least one image of the second 3D job and the at least one first image of the first 3D print job exceeds a threshold.

According to yet another embodiment, a method for detecting a 3D printing error is provided. The method comprises generating at least one image of a first 3D print job creating an object. The at least one image of the first 3D print job is stored in in a storage device. Determining whether a predetermined number of layers of a second 3D print job have been printed, wherein the second 3D print job is creating the same object as the first 3D print job. At least one image of the second 3D print job is generated. The at least one image of the second 3D job is compared to the corresponding at least one first image of the first 3D print job by analyzing corresponding pixels of the images. A pixel brightness indicator is generated for each pixel analyzed, each pixel brightness indicator having an intensity or brightness value from 0 to 255. Determining whether a threshold number of pixel differences has been exceeded. Determining whether more than a predetermined number of layers have failed. An error signal is generated if a difference between the at least one image of the second 3D job and the at least one first image of the first 3D print job exceeds a threshold of different pixels and failed layers.

The accompanying drawings, which are incorporated in and constitute a part of this specification, illustrate various embodiments of the invention and, together with the description, serve to explain the principles of the invention.

DETAILED DESCRIPTION OF THE INVENTION

Reference will now be made to the present preferred embodiments of the invention, examples of which are illustrated in the accompanying drawings in which like reference characters refer to corresponding elements.

Figure 1:
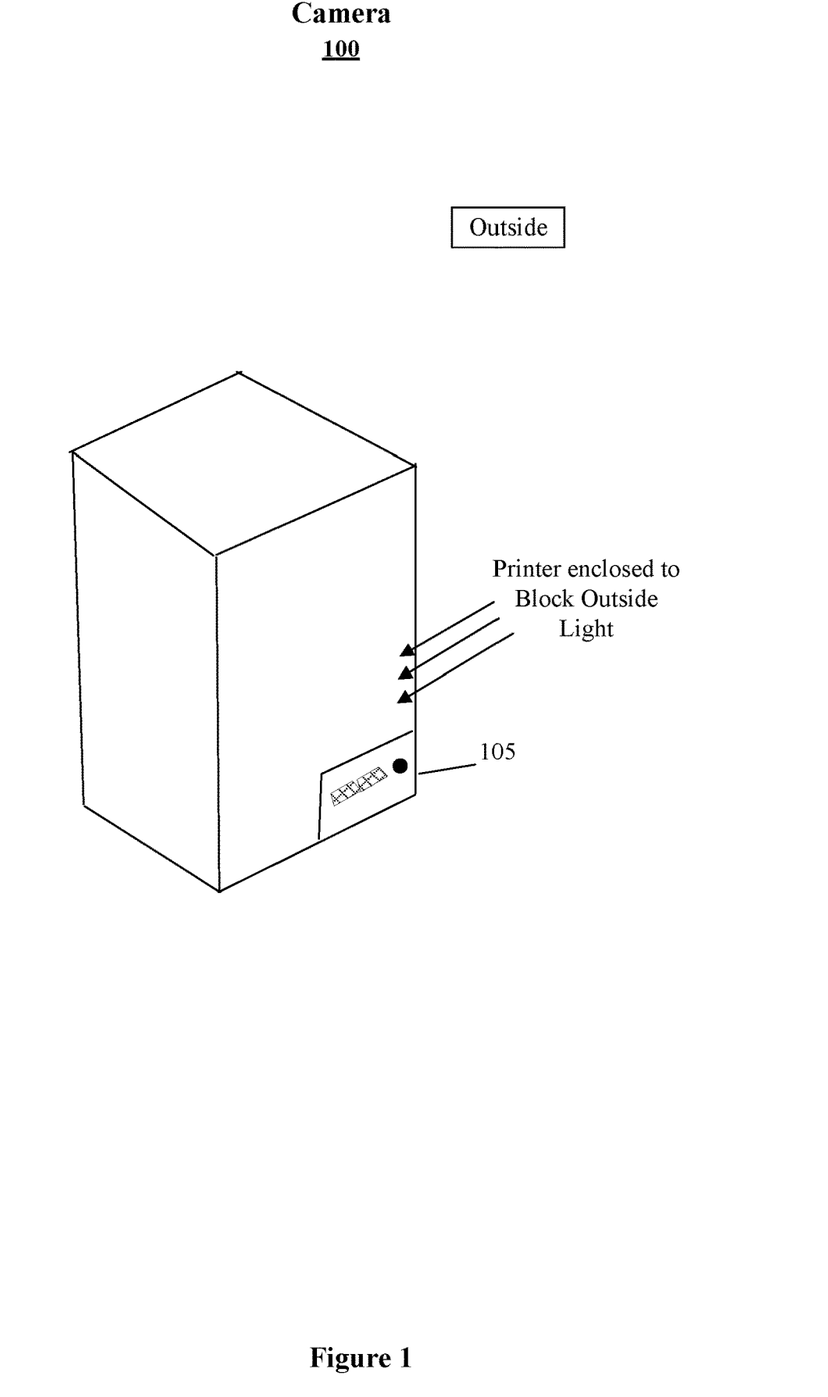
FIG. 1 is a perspective view of an enclosure containing a 3D printer error detection system, according to one embodiment of the present invention.

FIG. 1 is a perspective view of an enclosure containing a 3D printer error detection system 100, according to one embodiment of the present invention. In some embodiments, the 3D printer error detection system described herein may be contained within a light-blocking enclosure 105 to ensure quality imaging and error detection capabilities.

Figure 2:
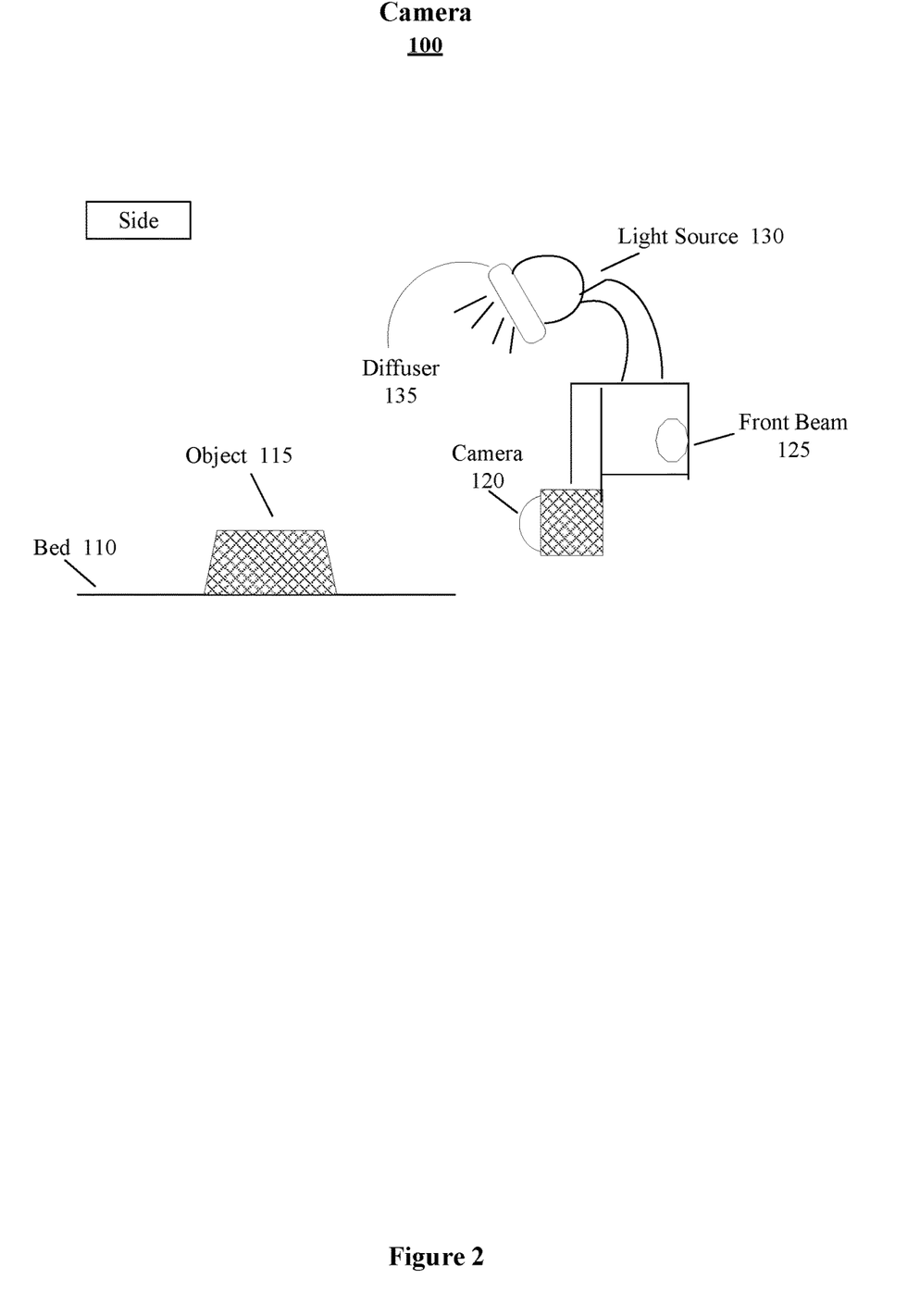
FIG. 2 is a side view of a 3D printer error detection system, according to one embodiment of the invention.

FIG. 2 is a side view of a 3D printer error detection system, according to one embodiment of the invention. As shown, the 3D printer error detection system includes a bed 110 on which the 3D object 115 is printed, a camera 120 for taking images of the 3D object at various stages of the job. In some embodiments, the camera may be mounted onto a front beam of the 3D printer, and a light 130 (with or without diffuser 135) may also be provided to enhance the lighting environment for image capturing purposes.

Figure 3:
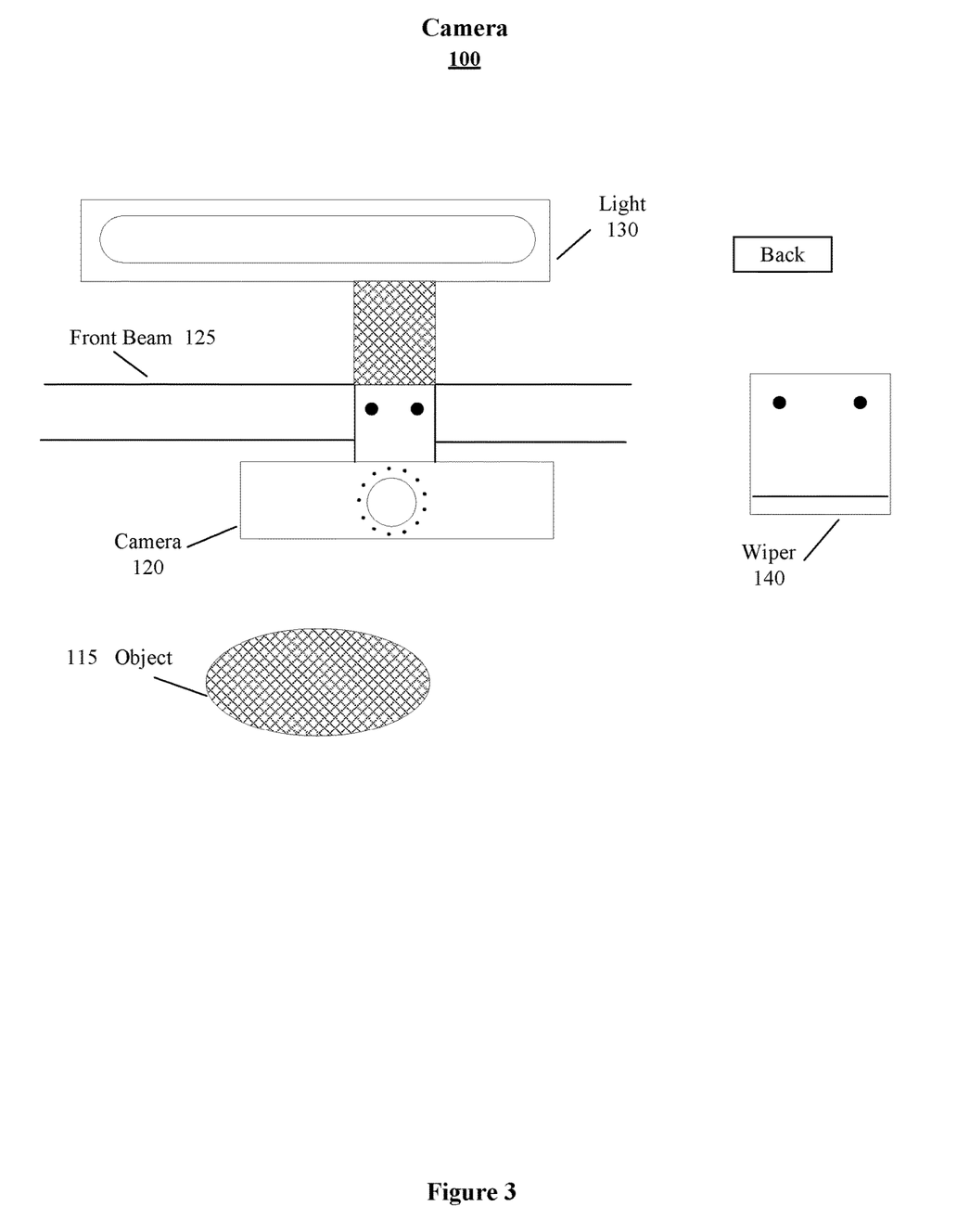
FIG. 3 is a back view of a 3D printer error detection system, according to one embodiment of the present invention.

FIG. 3 is a back view of a 3D printer error detection system, according to one embodiment of the present invention. This is the back view of the 3D printer error system shown in FIG. 2, but further depicting a wiper 140 which is used to clean the extruder component of the 3D printer that deposits filament and prints the desired object. In some embodiments, the camera is positioned in a stationary manner on the front beam so as to ensure images are captured from the same position relative to the object being printed. In other embodiments, the camera may move to more desirable image capturing positions—e.g., move between a resting location and an image capturing location.

Figure 4:
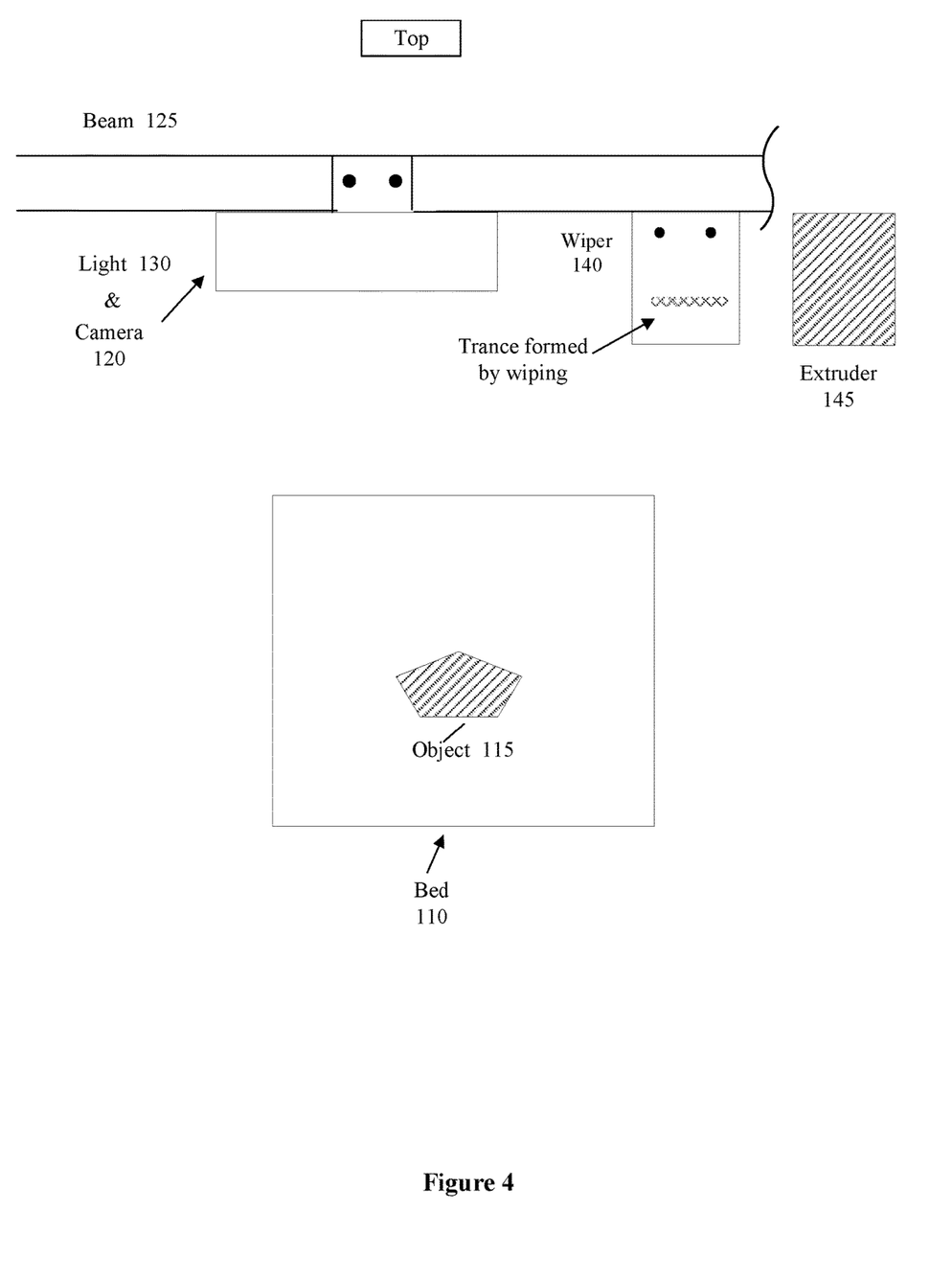
FIG. 4 is a top view of a 3D printer error detection system, according to one embodiment of the present invention.

FIG. 4 is a top view of a 3D printer error detection system, according to one embodiment of the present invention. This perspective shows all components depicted in FIGS. 2 and 3, but further depicting the extruder 145 which is shown off to the side of the wiper. In some embodiments, the positioning shown is for image capturing purposes since the extruder is out of the way of the camera and a clear and direct image of the object may be captured. Other image capturing positions are possible.

Figure 5:
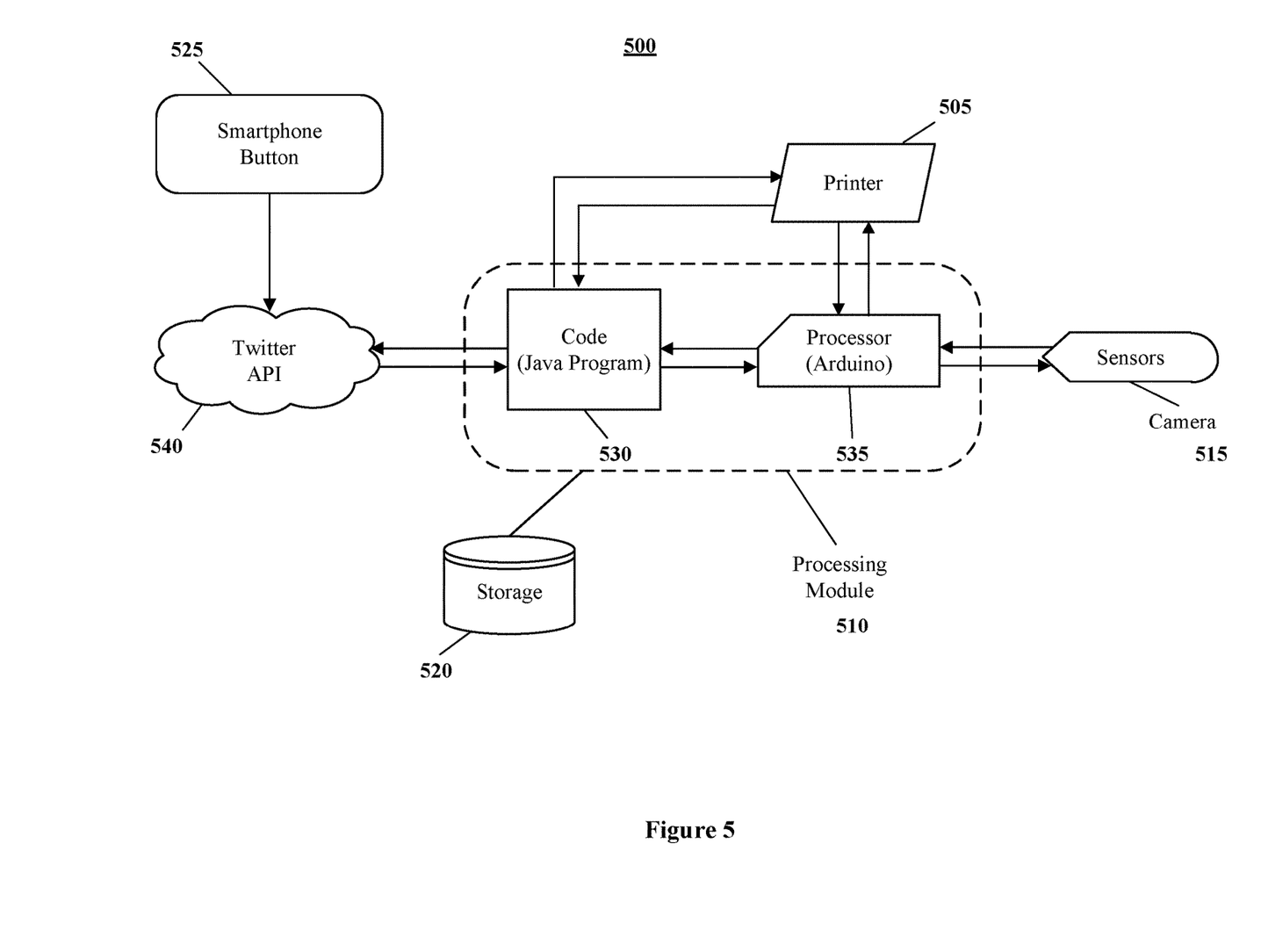
FIG. 5 is an overview of a 3D printer error detection system, according to one embodiment of the invention.

FIG. 5 is an overview of a 3D printer error detection system, according to one embodiment of the invention. As shown, an exemplary system architecture 500 of the present invention may include a 3D printer 505, a processing (e.g., error detection) module 510, sensors 515 (e.g., camera), storage device 520, and user communication device 525 (e.g., smartphone). In some embodiments, the error detection module 510 may comprise software 530 (e.g., Java program or other programming language or code) and a processor 535 (e.g., Arduino or other programmable processor or controller). The error detection module 510 may reside in a client, server, or any desktop, laptop or mobile device, or within the 3D printer device. In addition, the error detection module 510 may communicate with any component of the 3D printer error detection system by any number of communication protocols and over any type of communication network, e.g., Internet, WAN, LAN, Bluetooth, cellular, or any other network. For example, the processing module may initiate/stop 3D printing, initiate image capture (either in calibration or test/run mode), receive calibration and test run images of 3D print jobs, compare calibration and test/run images to detect errors (as described in detail below), and store such images in a storage device, for example.

In some embodiments, error detection module 510 may also notify users of 3D printing errors and provide related images. For example, upon detecting a print error, error detection module may send a user an image showing the print error. The user may then initiate a print stop to avoid additional waste of filament. The user may decide to let the print continue despite the error detection. As shown, users may communicate with the error detection module through any device (e.g., mobile phone, computer or other device) and communication network 540 (e.g., data network (Internet) wireless, cellular or phone), or protocol (e.g., Twitter, email, text message).

Figure 6:
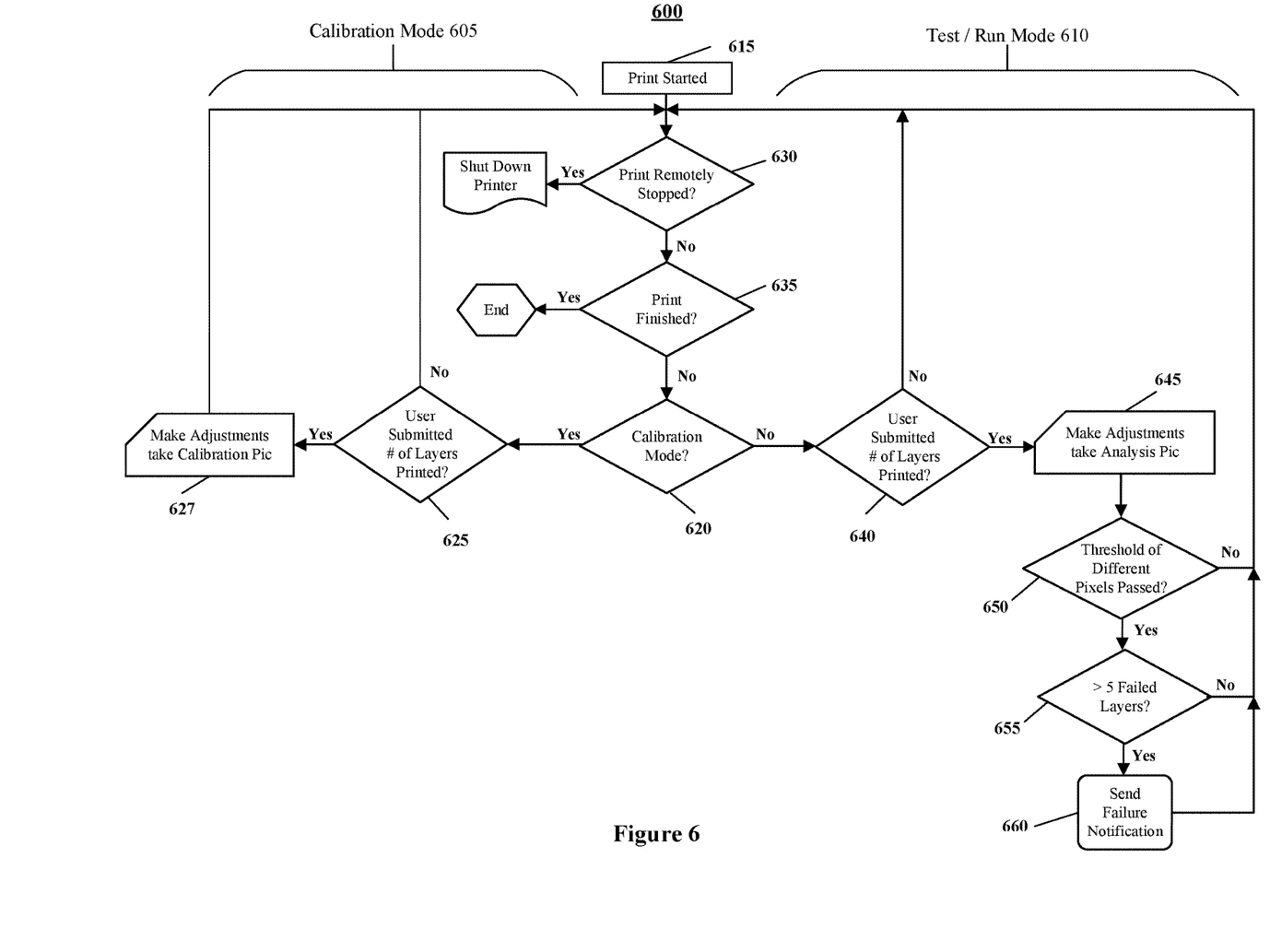
FIG. 6 is a method for detecting 3D printing errors, according to one embodiment of the invention.

FIG. 6 is a method 600 for detecting 3D printing errors, according to one embodiment of the invention. In some embodiments, the error detection module of FIG. 5 may perform the steps set forth in FIG. 6. Two modes are depicted: a calibration mode 605 and a test/run mode 610. At print start 615, error detection module may determine at step 620 whether it is a calibration or a test/run. If the former, it continues to print until a predetermined layer count of the printed object is achieved at step 625. For example, a user may set that after 20 layers a calibration image be taken at step 627. The predetermined number of layers can be any number desired, but may be influenced depending on the length of the print. Once the predetermined number of layers is achieved, adjustments may be made (e.g., the extruder moves away from in front of the camera), and an image of the object in its then printed state is taken. The print then continues until the next predetermined number of layers is achieved, and an image is taken. Thus, if the predetermined number of layers is 20 (and there are 200 layers required to print the entire object), then print will stop and a calibration image taken at 20, 40, 60, 80, 100, 120, 140, 160, 180 and 200 layers. The calibration process may continue until there is a print stop at step 630 (e.g., user initiated) or if the print is finished (step 635). If the print is a success, then the calibration images obtained may be stored in storage device for subsequent access and use in detecting errors.

Figure 8:
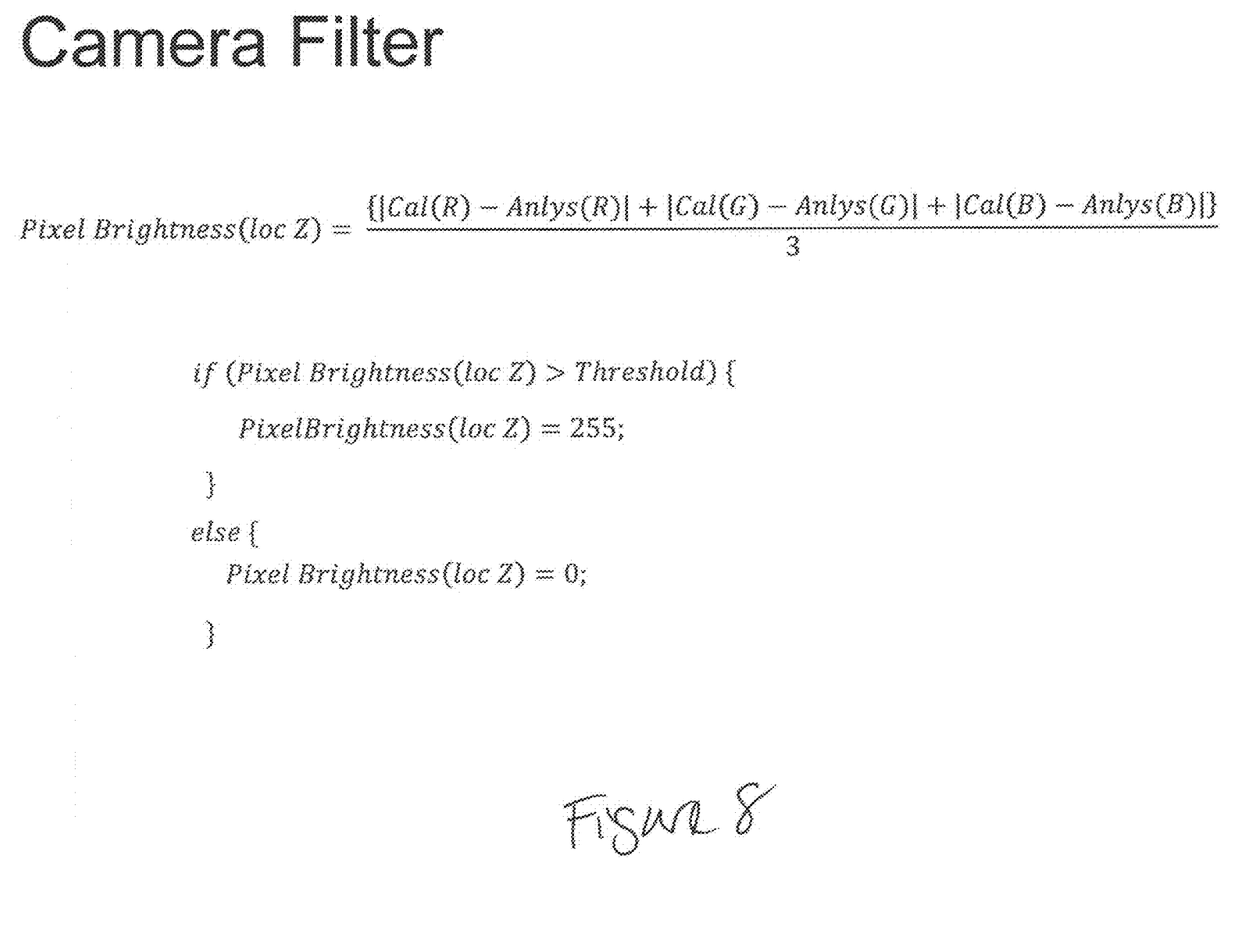
FIG. 8 is an exemplary algorithm for detecting 3D printing error, according to one embodiment of the present invention.

Once calibration is complete, subsequent test/runs of the same object may be performed. The test/run process is similar in that it continues until such time as the predetermined number of layers is achieved at step 640. For example, assuming a test/run print of the 200 layer object described above and a predetermined layer number of 20, the test/run will stop at 20, 40, 60, 80, 100, 120, 140, 160, 180 and 200 layers to take an image at step 645 and perform image analysis between the image taken and the corresponding calibration image. In some embodiments, the analysis is performed by an algorithm (e.g., running in error detection module). The algorithm, (an example of which is shown in FIG. 8), may then analyze images from the camera. In some embodiments, the error detection module goes through the calibration and analysis picture for the given layer height simultaneously, pixel-by-pixel, subtracting the analysis r, g, and b values from those of the calibration picture (each pixel is made of three sub-pixels, red, green, and blue, each given a brightness value from 0 to 255). It then averages these differences and finds the absolute value of them (don't want negative values), resulting in each pixel having a new intensity/brightness value from 0 to 255 (the more different the pixel, the more the rgb-values will vary, and thus the brighter they will be, vice-versa as well).

Using this analysis, the test/run mode determines at step 650 whether a threshold of different pixels is met (the threshold may be any number). If not, then the test/run process continues. If the threshold is exceeded, then a determination may be made at step 655 as to whether there are more than 5 failed layers (any predetermined number of failed layers may be set). If not, a failed layer count is maintained and the test/run process may continue. If more than 5 have failed, then a failure notification may be sent to a user at step 660, who can then decide whether to initiate print stop. In some embodiments, error detection module may automatically initiate print stop.

Figure 7:
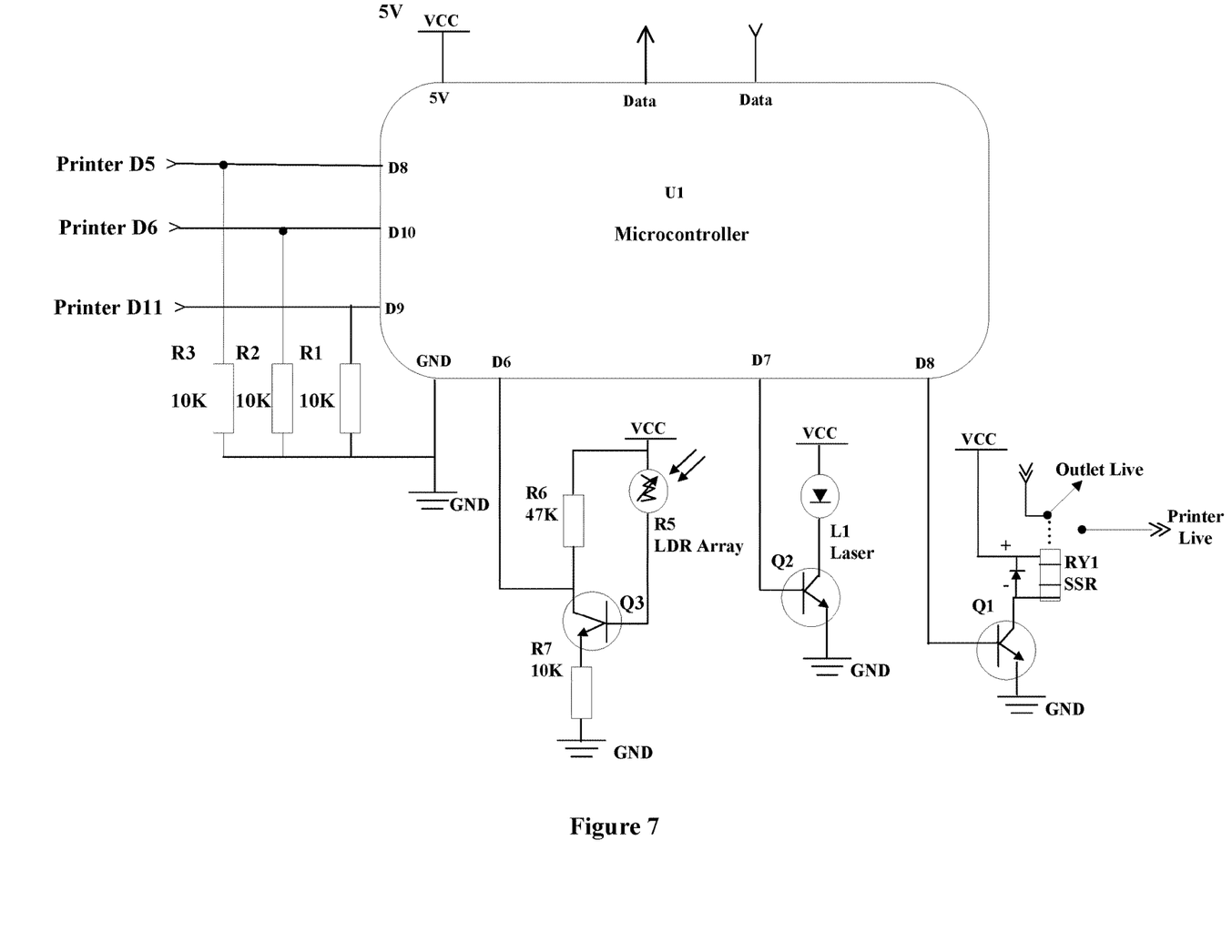
FIG. 7 is an overview of the interconnection between various components of the 3D printer error detection system, according to one embodiment of the present invention.

FIG. 7 is an overview of an exemplary interconnection between various components of the 3D printer error detection system, according to one embodiment of the present invention. FIG. 8 is an exemplary algorithm for detecting 3D printing error, according to one embodiment of the present invention. Other algorithms are possible.

Figure 9:
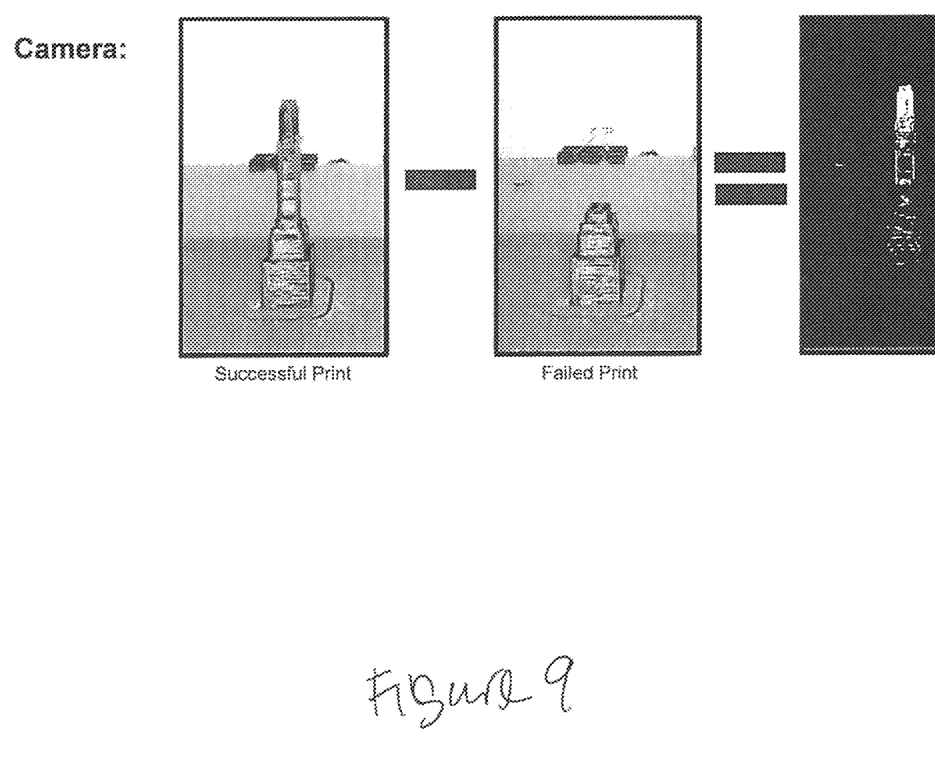
FIG. 9 is an exemplary 3D printer error, according to one embodiment of the present invention.

FIG. 9 is an exemplary 3D printer error, according to one embodiment of the present invention. As shown, the image on the left is an image of a successful print taken during the calibration run. The middle picture is the corresponding image depicting failure. The image on the right is the result of the comparative pixel-by-pixel analysis performed by the algorithm of FIG. 8.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A method for detecting a 3D printing error, comprising:
generating at least one image of a first 3D print job creating an object, wherein the at least one image of a first 3D print job comprises at least one calibration image;
generating at least one image of a second 3D print job, wherein the second 3D print job is creating the same object as the first 3D print job;
comparing at least one pixel of the at least one image of the second 3D job to a corresponding at least one pixel of the at least one calibration image;
determining at least one pixel difference indicator between the at least one pixel of the at least one image of the second 3D job and the corresponding at least one pixel of the at least one calibration image, the at least one pixel difference indicator having an intensity or brightness value from 0 to 255, and wherein the higher the value of the pixel difference indicator the greater likelihood of print error, and wherein the at least one pixel difference indicator is determined based on the difference between r g b values of a pixel in the at least one image of the second 3D print job and a corresponding pixel in the at least one calibration image; and
triggering an error signal if the at least one pixel difference indicator exceeds a threshold of different pixels and failed layers.

2. The method of claim 1 wherein the at least one image of a first 3D print job creating and the at least one image of a second 3D print job comprise digital images.

3. The method of claim 1 where in the threshold is predetermined.

4. The method of claim 1 further comprising the step of transmitting a notification signal to at least one user upon triggering of the error signal.

5. A system for detecting a 3D printing error, comprising:
an image capturing device for generating at least one image of a first 3D print job and at least one image of a second 3D print job, wherein the second 3D print job is creating the same object as the first 3D print job, and wherein the at least one image of the first 3D print job comprises at least one calibration image; and
an error detection processor for (1) comparing at least one pixel of the at least one image of the second 3D job to the corresponding at least one pixel of the at least one calibration image, (2) determining at least one pixel difference indicator between the at least one pixel of the at least one image of the second 3D job and the corresponding at least one pixel of the at least one calibration image, the at least one pixel difference indicator having an intensity or brightness value from 0 to 255, and wherein the higher the value of the pixel difference indicator the greater likelihood of print error, and wherein the at least one pixel difference indicator is determined based on the difference between r g b values of a pixel in the at least one image of the second 3D print job and a corresponding pixel in the at least one calibration image, and (3) triggering an error signal if the at least one pixel difference indicator exceeds a threshold of different pixels and failed layers.

6. The system of claim 5 wherein the image capturing device is movably attached to a 3D printer.

7. The system of claim 6 wherein the image capturing device is movable between a first printing position and second image capturing position.

8. The system of claim 5 further comprising a storage device for storing the least one calibration image.

9. The system of claim 5 wherein the at least one image of the second 3D print job is captured after a predetermined number of layers of have been printed.

10. The system of claim 5 wherein the error detection processor determines the difference between the at least one image of the second 3D job and the at least one calibration image on a pixel-by-pixel basis.

11. The system of claim 10 wherein the error detection processor determines whether a threshold of different pixels has been passed or exceeded.

12. The system of claim 11 wherein the error detection processor determines whether more than a predetermined number of layers have failed.

13. The system of claim 5 wherein the error detection processor transmits the error signal to a user over a communications network.

14. A method for detecting a 3D printing error, comprising:
generating at least one image of a first 3D print job creating an object, wherein the at least one image of a first 3D print job comprises at least one calibration image;
storing the at least one calibration image in a storage device;
determining whether a predetermined number of layers of a second 3D print job have been printed, wherein the second 3D print job is creating the same object as the first 3D print job;
generating at least one image of the second 3D print job;
comparing the at least one image of the second 3D job to the corresponding at least one calibration image by analyzing corresponding pixels of the images;
generating a pixel difference indicator for each pixel analyzed, each pixel difference indicator having an intensity or brightness value from 0 to 255, wherein the higher the value of the pixel difference indicator the greater likelihood of print error, and wherein the pixel difference indicator is determined based on the difference between r g b values of a pixel in the at least one image of the second 3D print job and a corresponding pixel in the at least one calibration image;
determining whether a threshold number of pixel differences has been exceeded;
determining whether more than a predetermined number of layers have failed; and generating an error signal if a difference between the at least one image of the second 3D job and the at least one calibration image exceeds a threshold of different pixels and failed layers.

\* \* \* \* \*